United States Patent [19]

Skidanenko et al.

[11] Patent Number: 4,511,763
[45] Date of Patent: Apr. 16, 1985

[54] FLOATING DC CURRENT SOURCE FOR A SUBSCRIBER LOOP CIRCUIT

[75] Inventors: Constatine V. Skidanenko, Menlo Park; Gregor D. McGibbon, San Carlos, both of Calif.

[73] Assignee: GTE Communication Systems Corporation, Phoenix, Ariz.

[21] Appl. No.: 437,936

[22] Filed: Nov. 1, 1982

[51] Int. Cl.³ .............................................. H04M 19/00
[52] U.S. Cl. .............................. 179/16 AA; 179/16 F; 179/70; 363/21
[58] Field of Search ........... 179/16 AA, 16 F, 18 FA, 179/70, 77; 363/21, 97

[56] References Cited

U.S. PATENT DOCUMENTS

| 4,402,039 | 8/1983 | Jirka | 363/21 |
| 4,429,186 | 1/1984 | Gartner | 179/77 |

*Primary Examiner*—Gene Z. Rubinson
*Assistant Examiner*—R. Vaas
*Attorney, Agent, or Firm*—Leonard R. Cool

[57] ABSTRACT

Under an off-hook condition a pulse width control circuit is periodically turned on by narrow pulses from a clock source. This initiates current flow from a primary dc source via the single primary winding of a transformer, and through power transistors connected in a Darlington configuration. A ramp voltage is developed across an emitter resistor of one of said power transistors and this voltage is feedback to said pulse width control circuit. When the ramp voltage reaches a predetermined value, the pulse width control circuit turns off the power transistors and the energy stored in the transformer is transferred by the collapsing magnetic field into alternating current in the secondary winding. This alternating current is rectified and filtered to provide loop current to the telephone subscriber loop. The voltage reflected from the secondary to the primary is stored in a peak detector circuit which operates to control the length of time during which the ramp voltage builds to its predetermined amplitude. The magnitude of this reflected voltage is a function of the loop resistance. Thus, a controlled loop current is provided which is dependent upon the loop resistance. When the loop resistance reaches a predetermined value, a breakdown diode in the output of the peak detector allows current to flow in an "idle power shutdown circuit" which interrupts the clock pulse input to the pulse width control circuit. This permits a reduction in power during the on-hook state.

3 Claims, 7 Drawing Figures

CLOCK OUTPUT WAVEFORM $V_T = -[V_{BAT} + (\frac{N1}{N2}) V_L]$

VT VOLTAGE WAVEFORM $V_C(t) = [(\frac{-V_{BAT}}{Z_{L1}}) R8] \cdot (t)$   where (t) = time

CONTROL VOLTAGE VC WAVEFORM

SECONDARY WINDING VOLTAGE AND RECTIFIER VOLTAGE

FLOATING DC CURRENT SOURCE FOR A SUBSCRIBER LOOP CIRCUIT

RELATED APPLICATIONS

This relates to Ser. No. 449,026, filed Dec. 13, 1982 and Ser. No. 449,030, filed Dec. 13, 1982.

BACKGROUND OF THE INVENTION

1. Field of the Invention

This invention relates to the supply of direct current to a telephone subscriber loop, and in particular to apparatus for providing a controlled current to the subscriber loop from a floating current source.

2. Background Description

The problem of supplying operating power from a central office to a subscriber telephone set is a continuing one. The arrangements for doing so are variously described as line feed circuits and telephone subscriber line circuits. For the standard telephone circuit the technique for supplying the operating current to the subscriber loop consisted essentially of two resistors which are designated as line feed resistors and these are in series with the central office battery. The voltage amplitude of the battery is in the range of 48 to 60 volts and the line feed resistors typically have resistance values ranging from 200 to 800 ohms depending upon the particular telephone exchange. These line feed resistors are selected at the central office to have a value which would produce the proper line current for the loop resistance characteristic expected by the telephone instrument to which it is to be connected.

Another common technique is by the use of a transformer, the primary of which is connected to the voice frequency circuit. The secondary consists of two windings, the two secondary windings being joined by a blocking capacitor, which provides a low AC impedance for voice frequencies and a high DC impedance. The battery voltage is applied to the one and other terminal ends of the capacitor. One problem with this approach is that loop supervision, i.e., on-hook, off-hook and dial pulsing information could not be detected by using the battery feed circuit. Thus, separate detection circuits are required. These traditional circuits are not energy efficient, because of the excessive loss in the line feed resistors.

More recently, floating battery feed circuits, which are more energy efficient, have been devised. One such circuit is disclosed in the U.S. Pat. No. 4,056,691 entitled, "Telephone Subscriber Line Circuit", L. Freimanis et. al., granted Nov. 1, 1977. In the referenced patent it is clear that the battery feed current is coupled to the telephone insturment from a source of positive and negative potential that "floats" (has a very high impedance) relative to earth ground. The main advantage of this method is that of very good longitudinal balance, which provides good immunity to AC induction. As shown in FIG. 3 of the referenced patent a transformer is included which has, in addition to the normal primary and secondary windings, a plurality of sense windings which are used to ensure a constant current supply to the subscriber loop when the battery feed circuit is turned on. Further, a number of external control circuits are required. For example, a scan flip-flop is used for status checks.

A technique by which a regulated loop current may be applied to the subscriber line is disclosed in U.S. Pat. No. 4,315,106, entitled "Apparatus For Regulating Current Supplied To A Telephone Line Signal Of The Type Employed In Digital Telephone Systems", inventor R. C. W. Chea, Jr., granted Feb. 9, 1982. In order to reduce the power consumption and thereby improve the energy efficiency, the circuit disclosed replaces the battery and series line feed resistors with the power supply circuit in which the line voltage is monitored and this information is used to control the actual supply voltage via the line feed resistors to the subscriber loop. By using this control technique the size of the line feed resistors can be reduced so that power dissipation is also reduced.

SUMMARY OF THE INVENTION

A floating battery feed circuit for providing a controlled subscriber loop current, includes a direct current primary source, which is switched by a DC-to-DC converter on the appearance of the leading edge of a clock pulse. This allows primary current to flow through the single primary winding of an isolation transformer until the converter is switched off. The magnitude and duration of the primary current flow is controlled by reflected voltage from the secondary circuit, which includes a rectifier circuit, isolated from ground. The rectifier supplies the direct current to the subscriber loop circuit. The rectified DC voltage developed, and hence the loop current, are dependent on the loop resistance, with the rectified voltage increasing as the loop resistance increases to ensure adequate current for the operation of the VF circuit. Thus, the reflected voltage also increases as the loop resistance increases. A feedback circuit limits the maximum loop voltage, and reduces power consumption, by immobilizing the DC-to-DC converter, when the loop resistance exceeds a predetermined value.

DETAILED DESCRIPTION OF THE INVENTION

A number of the prior art battery feed circuits provide a constant current to the subscriber loop. This means that a significantly high voltage must be available for the longer loops and it also means that the energy expended is significant. Present day telephone sets are designed to perform acceptably if they are provided with loop currents of between 20 and 80 milliamperes. Thus battery feed circuits including range extenders should be designed to provide a boosted battery so as to maintain a minimum of 20 milliamperes loop current.

Because of the obvious disadvantages of providing a constant current, it was a principle object of this invention to provide a means to inexpensively supply a source of controlled current from a floating source relative to earth ground. By floating is meant that the battery feed current is suppled from a direct current source having a positive and a negative potential each which have a very high impedance with respect to earth ground. By so doing very good longitudinal balance, which provides immunity to AC induction, is obtained. This is desirable because the nature of the environment for the telephone plant provides frequent exposure to large longitudinal currents induced by commercial power lines. To prevent these currents from coupling into the voice path of the channel unit associated with the voice frequency circuit, very good longitudinal balance is required. The traditional methods of providing subscriber loop current required careful transformer design with close matching of the split winding characteristics.

Figure 1:
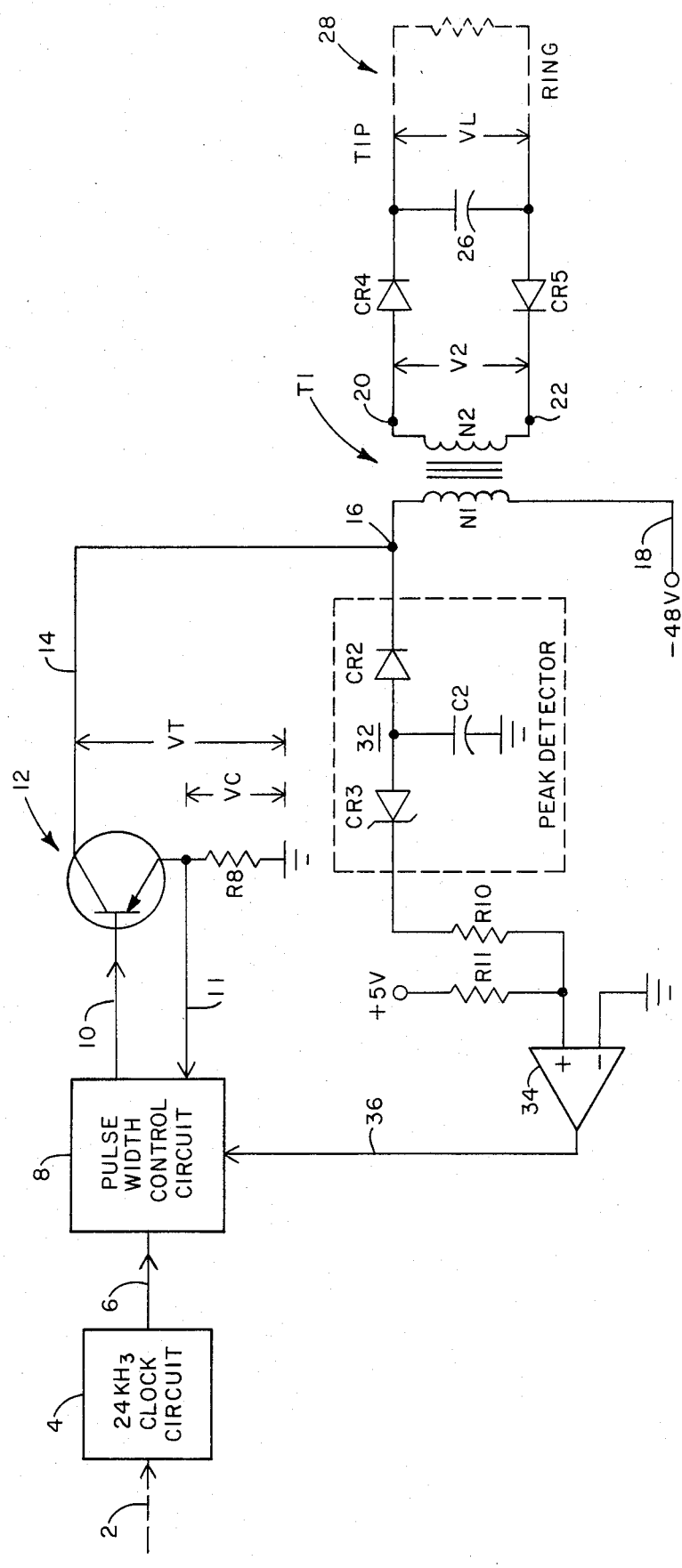
FIG. 1 is a simplified schematic diagram illustrating the basic elements of the preferred embodiment of the invention.

Referring now to FIG. 1 a floating battery feed circuit which inexpensively provides a controlled loop current to a subscriber loop is illustrated. A clock 4 provides a one microsecond pulse at a 24 KHz rate on path 6. Clock 4 may receive timing information from the local switching office, particularly if its a digital switching office. Because the common sampling frequency for PCM voice frequency telephone channels is 8 KHz, it is expected that this 8 KHz frequency would be availale and could be provided to the synchronizing input of the clock circuit via path 2. This provides a significant advantage in that the synchronization of the clock circuit with the local voice frequency sampling rate would preclude the introduction of spurious tones into a PCM coded signal. While the 8 KHz rate could provide for satisfactory operation, a higher clock pulse rate of 24 KHz was employed. This provides a smoothing effect to the rectified DC loop voltage and simplifies the filtering.

As will be explained in detail later, the leading edge of the clock pulse causes the pulse width control circuit 8 to provide drive current on path 10 to transistor circuitry 12. Transistor circuit 12 then goes into saturation with current flow between ground and the −48 volt battery connection at terminal 18 of transformer T1. Note that the current flows through the primary winding N1 of transformer T1 via junction 16 and path 14 to the collector of transistor circuit 12. The current flowing through the emitter resistor R8 provides the pulse width control voltage VC across resistor R8 and this voltage is fed back to the pulse width control circuit via path 11. When the voltage VC reaches a predetermined value, pulse width control circuit 8 is shut down and the drive to transistor circuit 12 is removed.

When the current begins to rise in the primary winding N1 of transformer T1, it increases in a substantially linear fashion, and this can be observed as a ramp voltage across resistor R8. The current in the winding will continue to rise until the voltage VC reaches the predetermined value and the base drive to transistor 12 is turned off. At this point, the energy stored in the primary N1 winding must be dissipated, and the collapsing field will induce a voltage into the secondary winding which is rectified by diode CR4 and the rectified voltage is stored in capacitor 26. This stored voltage is represented as VL.

As shown in FIG. 1, the loop resistance 28 appears substanially in parallel with capacitor 26, however, in the normal usage there are two series losses which are not shown in the drawing. These losses are attributed to a series resistor in the tip lead and a low pass ripple filter which is most often provided in the ring lead. The use of the filter results in an average DC loop voltage with a small (less than one volt) ripple, and the average current in the subscriber loop equals the average current supplied by the seconary of transformer T1. By the use of a fixed cycle time (fixed frequency) system, as is employed in this invention, an average loop voltage for a given loop current is equivalent to a predetermined power requirement, and also to a proportionate amount of the energy stored in the primary winding at the time the transistor circuitry is switched off. Because the energy stored in the primary is proportional to primary current squared ($\frac{1}{2} LI^2$) and in turn to the control voltage, VC, the loop voltage (loop current) for a given loop resistance can be controlled at the primary side of transformer T1 by the voltage VC.

As noted hereinabove prior art techniques used either constant current methods or control techniques similar to those disclosed here but in each case additional transformer sense windings are required on the primary in order to provide the functions noted above. As the loop resistance increases the loop current will decrease somewhat; but in order to provide adequate loop current the actual loop voltage VL must increase which means that the voltage applied to the transformer secondary must be increased. In order to accomplish this result the energy stored in transformer T1 during the time that transistor circuit 12 is turned on must be increased. In order to accomplish this the voltage VC must reach the predetermined voltage level, but only after a longer time interval, thus increasing the energy stored in the transformer, which is subsequently translated into a higher secondary voltage during energy transfer. This higher secondary voltage causes a higher reflected voltage, to be induced into the primary winding from the secondary winding as the loop impedance increases.

Figure 2:
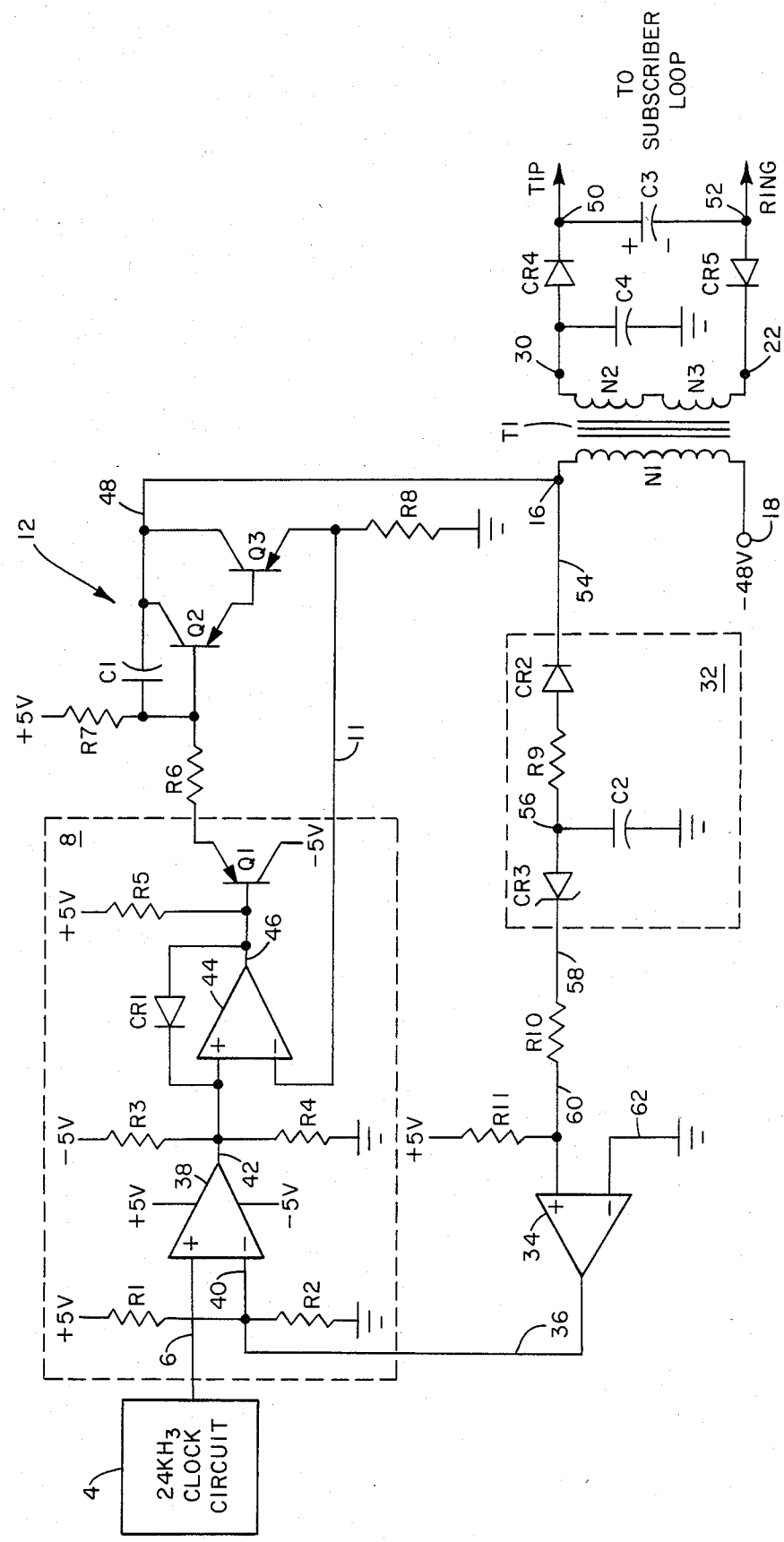
FIG. 2 is a detailed schematic diagram of a preferred embodiment of the invention.
Figure 3A:
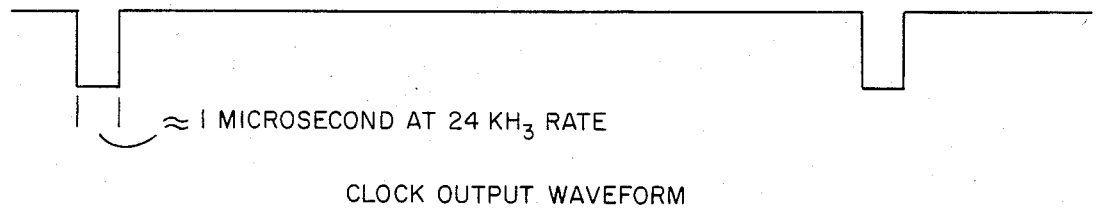
FIG. 3A is a waveform diagram showing the characteristic of the clock pulse input to pulse width control circuit 8.
Figure 3B:
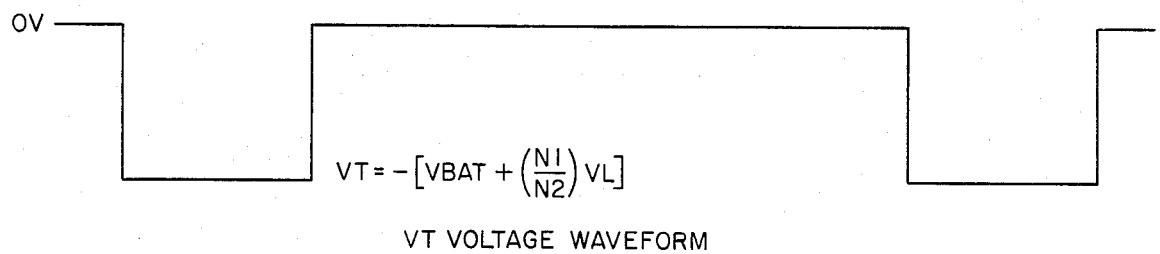
FIG. 3B is a waveform diagram showing the voltage characteristic VT between ground and the collector of the output transistor circuitry 12.

When the loop resistance increases to a predetermined value, something in the order of 2800 ohms, the circuitry is designed to sense an on-hook condition. This is accomplished by the use of a peak detector 32 and an operational amplifier 34. Capacitor C2 in peak detector 32 is initially charged to approximately 48 volts by the battery supply voltage, −48 volts, in conjunction with diode CR2. CR3 is a voltage breakdown diode which is used to fix the operating voltage needed before the on-hook condition is sensed. In a practical implementation, the breakdown voltage selected was 51 volts. At about 2800 ohms the voltage stored on capacitor C2 exceeds the breakdown voltage, 51 volts of CR3. As the loop resistance further increases, the voltage across the voltage divider network consisting of resistors R10 and R11 changes, and when the loop resistance reaches approximately 4500 ohms the output of the operational amplifier 34 changes from an open state, i.e., a high resistance, to an output of −5 volts. The effect of the −5 volt input is to limit the effect of the sync pulses from clock 4 by a gating action within the pulse width control circuit 8. This provides a pulse rate modulation of the transistor drive such that the power dissipation in the battery feed circuit is reduced significantly as the loop resistance approaches the on-hook condition. This is an immobilizing action and has been designated as "idle power shutdown" as the intent is to minimize total power dissipation in the on-hook state. Only enough of the sync pulses are now allowed to propagate through the control circuitry in order that on-hook to off-hook transitions might be identified A more complete understanding of the operation of the invention may be understood by referring to FIG. 2 in conjunction with the following discussion. The 24 KHz clock circuit 4 is shown only in block form but it may be implemented using a linear integrated circuit such as type number NE 555 or LM 555. Such devices are manufactured by National Semiconductor, Intersil and Signetics as well as others. The clock pulse output on path 6 is as shown in FIG. 3A and the pulse width is substantially one microsecond although it is anticipated that the clock pulse width may vary somewhat from that value, e.g., between 0.8-1.2 microseconds. Thus a single switched ground pulse of 0.8-1.2 microseconds in width is produced every 24 KHz by the 24 KHz clock circuit. The sync pulse frequency, as noted hereinabove, was chosen to be an integral multiple of the speech sampling frequency and thus could be synchronized to the 8 KHz channel frequency used for that purpose in a digital switching terminal. This interconnection has not been shown in FIG. 2. The reason for synchronizing the pulse to the channel frequency is to prevent any "beat frequency" effects which might arise from the converter, i.e., the pulse width control circuit 8. In the event that harmonics of the switching frequency are different from the 8 KHz sampling frequency, the beat frequencies from an unsynchronized clock source could unintentially be sampled by the 8 KHz sampling frequency and be digitized as in interferring audible signal within the voice frequency range.

The pulse width control circuitry 8 includes comparator 38 which has a reference level set by resistors R1 and R2 at 2.5 volts for an off-hook condition. As noted above in the off-hook condition, i.e., the loop impedance is less than that recognized as a on-hook state, operational amplifier 34 provides a high impedance input via path 36. This does not adversely affect the biasing arrangement at the inverting input to comparator 38. As noted hereinabove in the discussion with respect to FIG. 1, in the on-hook state the sync pulses have been modulated such that they do not all pass through comparator 38 and an "idle power shutdown" condition is in effect. When an off-hook condition exists, the sync pulses are then allowed to freely pass through comparator 38.

In order to prevent the voltage at the non-inverting input of operational amplifier 44 from rising above a predetermined level, bias resistors R3 and R4 are used. The effect of these resistors is to limit the voltage rise that might otherwise occur when the transistor circuitry 12 is in saturation. In a practical implementation the voltage was limited to 125 volts. By so doing the loop supply current also is limited regardless of loop length. While not involved in this invention, it is important to note that the central office battery current is separately limited as a safety measure and the manner in which this is done is well known. Comparator 44 and associated components provide three functions that are vital to the provision of a controlled current to the loop. One is that it acts as a latch in conjunction with diode CR1; two it acts as a comparator; and, three it acts as a pulse width modulator. Assume that transistor circuit 12, i.e., Q2 and Q3, is turned off. The output of comparator 44 is high and this pulls the non-inverting terminal to about +3 volts via diode CR1. The input voltage at the non-inverting input of comparator 44 exceeds the threshold level of the invering terminal, i.e., approximately −1 volt, so the positive feedback through diode CR1 keeps the comparator 44 output at +5 volts. Comparators are of the type which have NPN open collector outputs with the emitters returned to −5 volts. A linear integrated circuit such as an LM 339 manufactured by National Semiconductor may be employed. During this off-hook condition we assume that comparator 34 is off, which results in a high impedance output. Thus, the inverting input of comparator 38 is set to +2.5 volts by the equal-valued bias resistors R1 and R2.

Assuming that a negative sync pulse has passed through comparator 38, the non-inverting input of comparator 44 goes low which pulls the output low as well. Diode CR1 provides a latching function so that when the output changes this output state is held until a feedback control signal is applied to the inverting input. When the output of the comparator 44 goes low, transistor Q1 is turned on thereby providing base drive to the Darlington circuit configuration consisting of transistors Q2 and Q3 and associated components, which make up the transistor circuitry 12. With Q2 and Q3 biased on, current begins to flow in the primary winding N1 of transformer T1 as the collectors of the transistors are connected via path 48 and junction 16 to the primary winding N1 of transformer T1 and thence to the battery supply voltage via junction 18. While a single output transistor could be used the Darlington transistor configuration has been employed since it provides additional gain over the conventional single transistor switch thus minimizing switching losses associated with turning transformer T1 on and off.

During the time that transistors Q2 and Q3 are turned on, current is allowed to build up in the primary winding until the voltage across resistor R8 is suffllicient to unlatch comparator 44. The current build up time is affected by loop length, i.e., resistance, because of the change in value of the voltage reflected from the secondary to the primary. Thus, the time for the voltage VC to reach a predetermined value will vary and this changes the time during which transistor Q2 and Q3 are truned on. Hence the pulse width is determined as the time between the latching of comparator 44 by the leading edge of the clock pulse and the feedback of the predetermined voltage developed across R8, When this predetermined voltage is reached, comparator 44 is unlatched, the transistor Q1 is turned off, which, in turn, turns off transistors Q2 and Q3. The interruption of current flow causes the stored energy to be transferred to the seconary winding of transformer T1 as the core flux of transformer T1 collapses. The amount of energy stored will vary with the pulse width established and is directly related to the loop voltage hence loop current. In the tip lead of the secondary circuit, rectifying diode CR4 feeds a storage capacitor C3 which receives the stored energy from the primary of transformer T1. The subscriber loop resistance, not shown in FIG. 2 but generically shown in FIG. 1, is substantially in parallel with the capacitor C3 except, as noted above, for the two series losses consisting of a series resistor connected in the tip lead and the low pass ripple filter connected in the ring lead of the loop feed circuit.

Figure 3C:
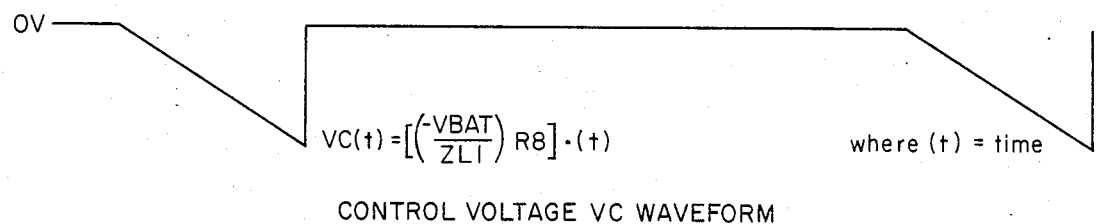
FIG. 3C is a waveform diagram illustrating the ramp characteristic of the voltage developed across the emitter resistor in the transistor circuit 12.
Figure 3D:
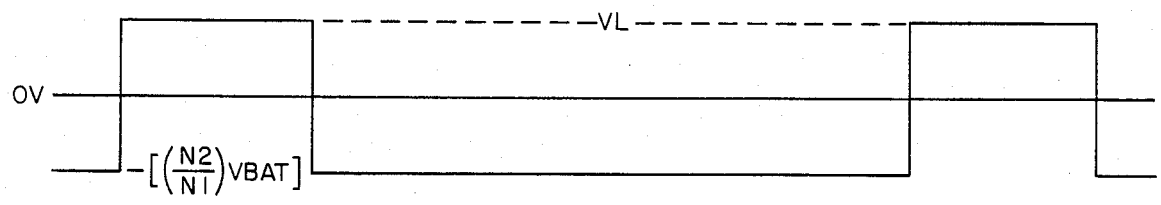
FIG. 3D is a voltage waveform diagram of the output voltage on the secondary winding of transformer T1.

As is apparent from the foregoing no separate sense winding is required in transformer T1 in order to provide the control information which permits the supply of a controlled current as required by the loop resistance. The design has been such that the loop current is not constant but gradually varies with loop resistance such that approximately 60 milliamperes flows on short loops, i.e., of about 100 ohms, and about 25 milliamperes on long loops, i.e., 2,000 ohms. By not having the loop current maintained at a constant value, power dissipation is kept low on the short loops without the necessity of adjusting transmission gains. The method of control is achieved by feeding back the voltage across resistor R8, i.e., the Q3 emitter resistor, to the inverting input of comparator 44. The voltage across resistor R8 is a negative ramp as shown in FIG. 3C and has a negative amplitude of about −1 volt peak. The width of the ramp, i.e., its' duration, is a function of the subscriber loop resistance. In practice the width of the ramp varies from about 6 microseconds for the short loops to 16 microseconds for the long loop lengths. The threshold voltage level at the non-inverting input of comparator 44 is set by choosing the appropriate scaling resistors R3 and R4. Of course this choise must be made in conjunction with the selection of the core and winding parameters. The core material used is of the ferrite linear type used in switching applications. In contrast to previously used control methods, which required additonal sense windings to provide battery feed and "idle power down" conditions, only a two winding transformer is needed to provide these functions. Transformer T1 has a built-in sense winding in the form of the primary winding which serves an additional function in that it provides a DC working voltage for the Darlington transistor configuration. This voltage varies from about −48 volts dc for the short loop lengths to approximately −125 volts dc for the long loop lengths. The control method for achieving a controlled loop current is a function of ramp width, which is related to the Q3 voltage across emitter resistor R8. This establishes the pulse width, i.e., the on-time of the transistor circuit 12.

By making the loop current a function of ramp width, voltage sense windings along with additional peak detectors and storage capacitors have been eliminated. By eliminating the voltage sense windings along with their feedback paths, a significant reduction in the number of components was obtained; but, in addition a controlled loop current, in accordance with the teachings of the invention, was still provided. Further, an improvement in performance has been achieved by this removal of the sense windings. Undershoot, overshoot, and ringing which results from switching of the Darlington transistor configuration is greatly reduced, because additional stray capacitance associated with the sense windings has been eliminated. It is well known that a transformer may be wound more symmetrically aroung the bobbin when only a single primary and single secondary are needed. This becomes significant in complying with FCC Rules, Part 68, Appendix B, Noise Interference Requirements. A balanced transformer reduces the conversion-frequency ripple associated with the battery feed clock. Only two components are needed to reduce both metallic and longitudinal frequency ripple below the −68 dbv as required by the FCC. Diode CR5 is used to provide symmetry on the secondary side of transformer T1 and capacitor C4 is used to compensate for the small amount of stray capacitance associated with the transformer. Previous methods used in reducing the conversion frequency ripple included using two or more capacitors, resistors and inductive chokes along with much more careful transformer design.

Referring now to the idle power shutdown circuitry it is to be noted that the primary winding of T1 also feeds a peak detector 32 consisting of a fast recovery diode CR2, resistor R9 and capacitor C2. The peak detector allows a negative voltage to be stored in capacitor C2. Initially this voltage is approximately equal to the battery voltage, i.e., −48 volts. As the loop resistance increases the loop voltage increases as well. When the loop resistance exceeds about 1800 ohms the breakdown voltage of the 51 volt breakdown diode CR3 is exceeded. At this point resistors R10 and R11 form a voltage divider network. As the loop resistance increases further, the voltage across the voltage divider network, resistors R10 and R11, increases as well, as the voltage on path 58 becomes more and more negative. The function of resistor R11 is to set the non-inverting input terminal of comparator 34 to a positive voltage. When the loop resistance of approximately 3200 ohms is exceeded, the voltage on path 60 goes negative and the output of comparator 34 switches to its negative supply potential of −5 volts. As explained hereinabove this essentially shuts down the comparator 38 thereby reducing the power consumption and the power supplied to the secondary of transformer T1.

Figure 4:
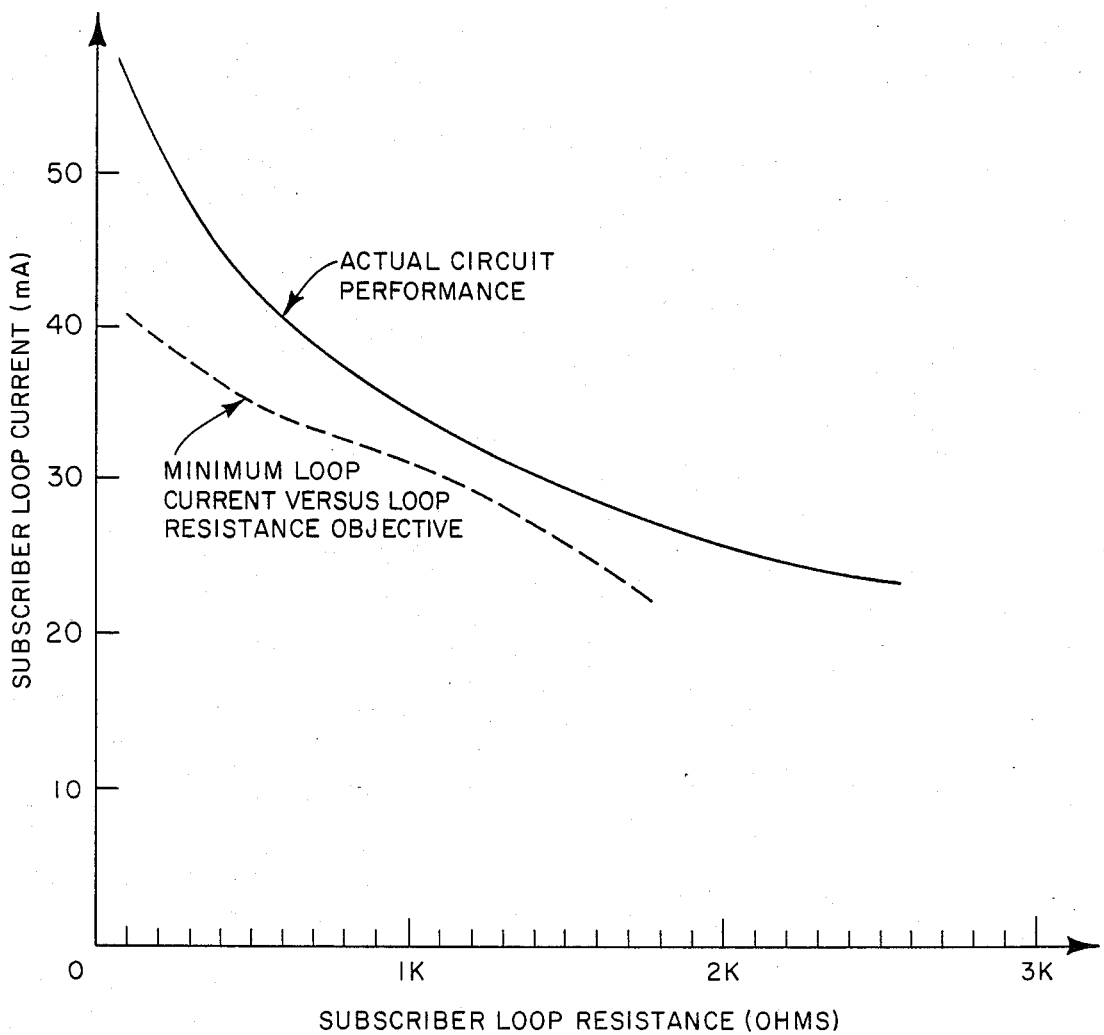
FIG. 4 is a graph of the subscriber loop current versus subscriber loop resistance for the minimum current objective and actual circuit performance of the preferred embodiment of the invention.

The minimum loop current objective vs. loop resistance is shown in FIG. 4. Also, the actual loop current vs. loop resistance as obtained by the teaching of this invention is also shown in FIG. 4. A study of the graph shows that the loop current control circuitry provides necessary loop current as well as adequate margin so that the battery feed circuit meets commercial telephone practice.

What is claimed is:

1. In floating battery feed circuit, apparatus for providing a controlled subscriber loop current comrising:
   a primary dc source having positive and negative output terminals, said positive output terminal being connected to ground;
   a transformer having only a primary and a secondary winding and no sense winding, a first terminal of said primary winding being connected to said negative output terminal of said primary dc power source;
   a rectifier circuit connected between the first and second output terminals of said secondary winding, the output of said rectifier circuit being adapted for connection to the tip and ring leads of the subscriber loop;
   a clock source providing an output pulse at predetermined time intervals;
   a pulse width voltage converter means obtaining power from said primary dc source and being responsive to a clock pulse for enabling the passage of direct current from said primary source throgh said primary winding, said converter means including feedback control means providing an indication of the magnitude of said passing direct current;
   latch means causing said converter means to pass said direct current until it is disabled, which disablement occurs either at the trailing edge of said clock pulse if a feedback control indication from the associated means is below a predetermined value, or when the feedback control indication from the associated means reaches said predetermined value after termination of said clock pulse; and means responsive to a reflected voltage from said secondary winding for immobilizing said converter means when the subscriber loop impedance exceeds a threshold value, whereby an on-hook high impedance condition is recognized, thus reducing power consumption during the idle circuit condition;

said converter means further comprising a first operational amplifier having a non-inverting input receiving the output pulse signals from said clock source and an inverting input electrically connected to an output of said immobilizating means, said inverting input being normally held at a fixed bias except during immobilizing intervals; and a second operational amplifier having a non-inverting input receiving a pulse output from said first operational amplifier, having said latch means which comprises a diode being connected between an output terminal and said non-inverting input of said second amplifier, said diode normally being forward biased but the presence of a clock pulse at said non-inverting input thereof causing it to be back biased and latched at least for the duration of said clock pulse; said second amplifier having an inverting input receiving the feedback control signal from said feedback control means and thereby holding said second operational amplifier latched if the feedback voltage applied to said inverting input thereof exceeds said predetermined value before said clock pulse terminates; and said immobilizing means comprising a peak detector having an input connected to the other terminal of said primary winding and being responsive to the reflected voltage from said secondary winding which is enhanced by the turns ratio of said transformer, having an output and including means for storing said voltage; a breakdown diode having an input receiving the output voltage from said peak detector and being responsive to such voltages above it's breakdown voltage to provide an output voltage thereof; and a third operational amplifier having a non-inverting input connected to the output of said breakdown diode, said non-inverting input also having a fixed reference voltage applied thereto which causes a high impedance output thereof except when the output voltage from said breakdown diode reaches a predetermined value in which event the output of said third operational amplifier becomes a negative voltage, thereby biasing said first operational amplifier so that it is non-responsive to said clock pulses, which reduces the power dissipation during on-hook conditions of the subscriber loop.

2. Apparatus as set forth in claim 1 wherein said transformer secondary includes two windings portions each of which have an equal number of turns, one end of each winding portion being connected together to form a single winding secondary, the use of two windings portions of an equal number of turns providing symmetry and a reduction in stray capacitance, whereby the conversion-frequency ripple is reduced.

3. Apparatus as set forth in claim 2 wherein the rectifier circuit connected to said secondary includes:
 a second diode serially connected in the tip lead of the circuit, and a storage capacitor having one terminal connected to the output of said second diode and having the other terminal connected to the ring lead;
 a third diode poled for direct current transmission such as is provided by said second diode, said third diode being serially connected in said ring lead, thereby improving longitudinal balance of the subscriber loop; and
 a damping capacitor connected between the anode of said second diode and ground in order to reduce switching transients which would adversely affect transmission.

* * * * *